Aug. 12, 1941.    L. McLAUGHLIN    2,252,437
ASSEMBLING APPARATUS
Filed July 26, 1939    3 Sheets-Sheet 1
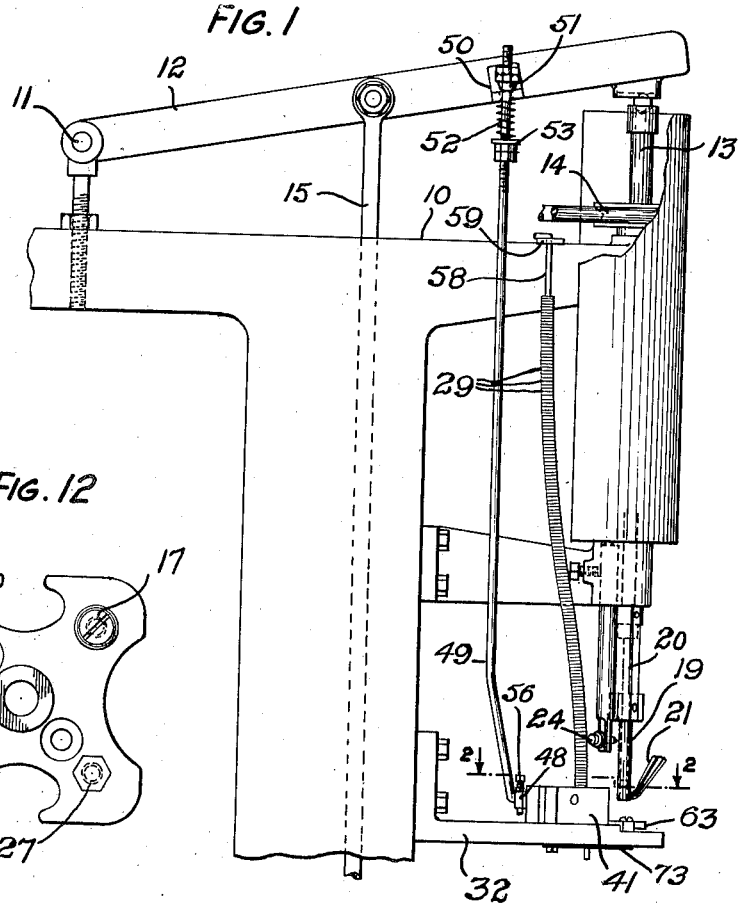
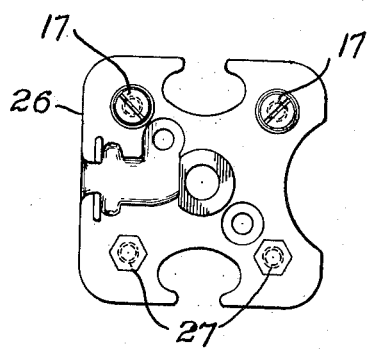
INVENTOR
L. McLAUGHLIN
BY Emery Robinson
ATTORNEY

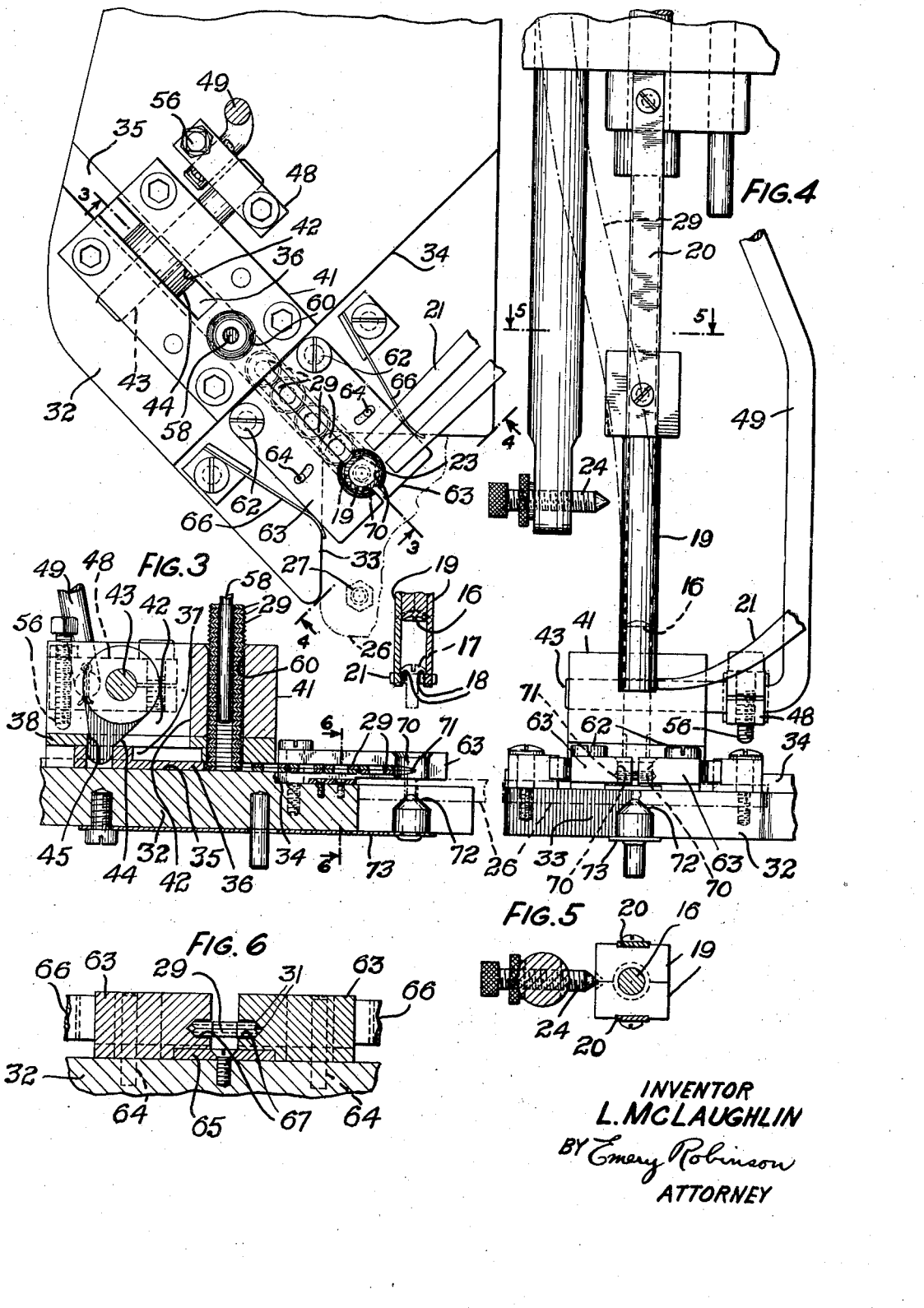

Aug. 12, 1941.　　　L. McLAUGHLIN　　　2,252,437
ASSEMBLING APPARATUS
Filed July 26, 1939　　　3 Sheets-Sheet 3
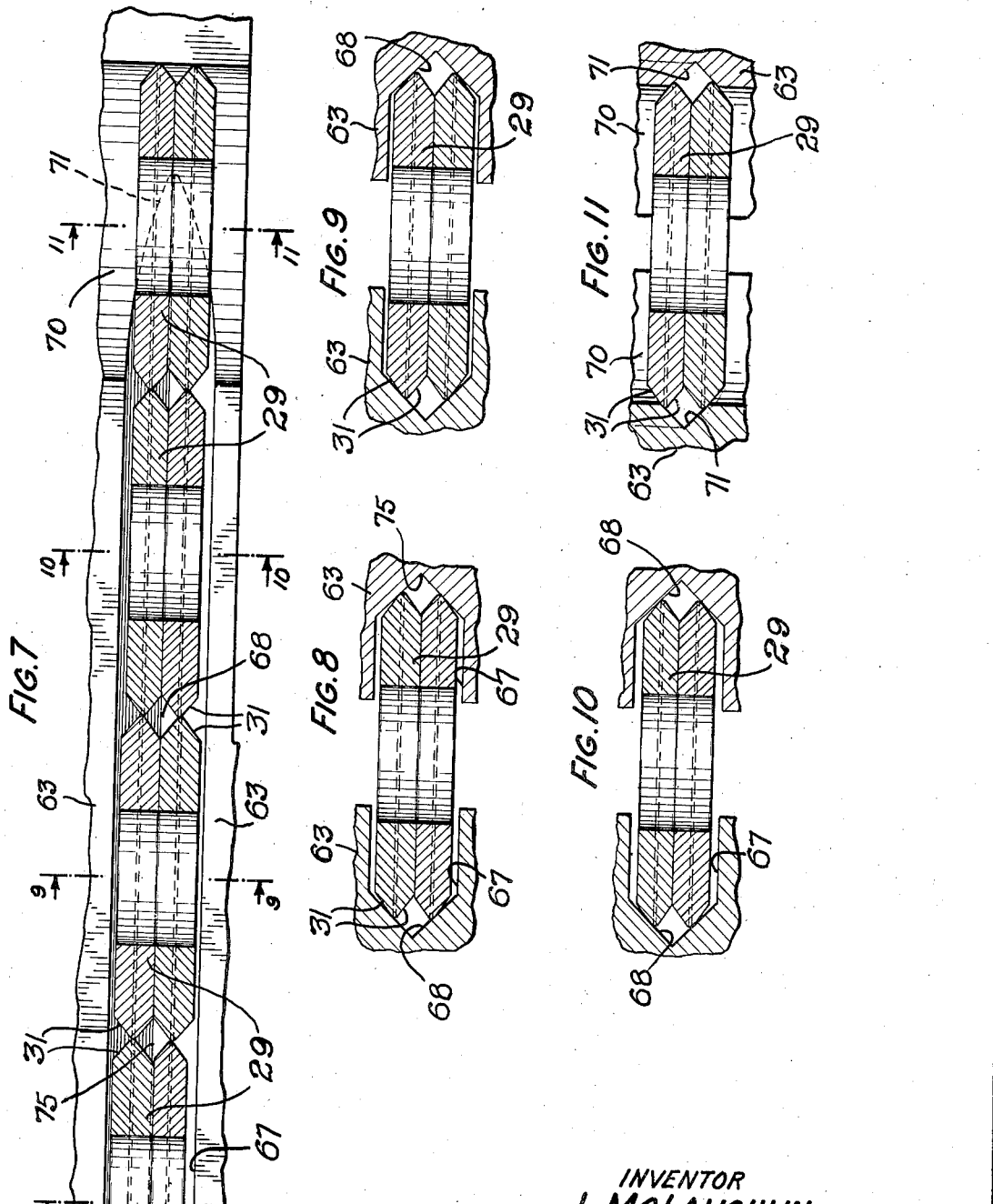
INVENTOR
L. McLAUGHLIN
BY Emery Robinson
ATTORNEY Patented Aug. 12, 1941

2,252,437

UNITED STATES PATENT OFFICE 2,252,437

ASSEMBLING APPARATUS

Lawrence McLaughlin, Downers Grove, Ill., assignor to Western Electric Company, Incorporated, New York, N. Y., a corporation of New York Application July 26, 1939, Serial No. 286,516

6 Claims. (Cl. 29—84)

This invention relates to assembling apparatus and more particularly to an apparatus for advancing parts into position relative to other parts for assembly.

It is the practice in some instances in the manufacture of electrical devices to use a plurality of washers having beveled peripheral edges under the heads of binding screws, the beveled edges of the washers facilitating the insertion of terminal wires between the washers in electrically connecting the device. In the assembly of such screws and washers on electrical devices by means of a power screw driver it is necessary to position the plurality of washers in coaxial relation with and below the screw and positively support them thereat prior to the advance of the screw driver blade to thread the latter into the device. In order to efficiently assemble such screws and washers it is desirable to employ a washer feeding mechanism, which is operable in timed relation with the advance of the screw driver blade, to remove a plurality of washers from a supply stack and feed them along a slideway and position them under the head of each screw prior to the screw being threaded into the device. With this type of beveled edge washer, difficulty has been encountered in machine feeding a plurality of such washers due to variations in the thickness of the strip metal from which the washers are formed, since it is very difficult to maintain a desired uniform dimension in the thickness of the metal strips in commercial practice. Heretofore, this variation in the thickness of this type of washer when handled in a usual type of feeding mechanism resulted in a frequent jamming or wedging between successive sets of washers, depending on the variation in the thickness of the washers relative to the thickness of the washers in the adjacent set. Due to this variation, the washers, under pressure of the feeding mechanism ride under or above the beveled edge of an adjacent washer and consequently jam in the slideway.

An object of this invention is to provide a practical, efficient and reliable apparatus for accurately feeding, positioning and positively supporting a plurality of parts relative to other parts for assembly.

In accordance with the above object, this invention contemplates in one embodiment thereof as applied to a power screw driver of a commercial type an attachment therefor for accurately and intermittently feeding a pair of washers, formed with beveled peripheral edges into coaxial assembling relation with and below the head of a screw.

Specifically, the washer feeding attachment of this invention comprises a reciprocatory slide operatively connected to means which actuates the reciprocatory screw driver blade, whereby each time the blade is advanced to engage a screw the slide is actuated in timed relation therewith to advance a pair of coaxial washers, previously deposited by gravity in a slideway in the path of the slide, from a vertical supply stack during the retraction of the slide. Each set of washers is progressively advanced along and from the slideway in abutting peripheral relation and between resiliently and pivotally mounted spaced guiding and positioning members. The members are provided with opposed slideways having V-shaped inner side walls along which each successive set of coaxial washers are guided in their advance to the assembling position, which is disposed between opposed arcuate-shaped faces in the free ends of the members in axial alignment with the screw driver blade. By advancing the sets of washers along the particular type of slideways the upper and lower faces of the coaxial washers of each set are maintained in parallel and abutting relation with their peripheral edges equally spaced at all times from the center line of the opposed V-shaped side walls. This is due to the cooperative action of the resilient members and the inclined faces of the side walls formed in the slideways thereof which are effective to raise or lower each set of washers, depending on the variation in the thickness of the washers, until their peripheral edges are equally spaced at each side of the center line of the V-shaped side walls. With this arrangement of guiding beveled peripheral edged washers any cumulative displacement between the beveled edges due to differences in the thickness of washers from an ideal or tolerable thickness is reduced to a minimum and a degree such that the beveled edges of the washers of one set do not ride under or above the beveled edges of an adjacent set. Thus guided, no jamming or wedging between the washers of adjacent sets will occur although the washers may vary in thickness within tolerable limits. The V-shaped walls terminate slightly beyond the center of the washers when they are in assembling position and thus are positively but lightly supported at diametrically opposite points between the arcuate shaped faces and upon the beveled or inclined side walls of the resiliently mounted members. During the advance of the screw driver blade it engages the slot in the head of the screw, advances the screw and inserts the blank thereof through the washers and upon the screw being threaded a predetermined distance into the device, in the present instance, a connecting block base member used in the installation of telephone sets, positioned thereunder to receive it, the members move slightly apart as the washers are pressed against the inclined faces of the slideways of the members, thus releasing the washers.

Other objects and advantages of the invention will become apparent from the following detailed description, taken in conjunction with the accompanying drawings, in which—

Fig. 1 is a fragmentary side view of a power screw driver equipped with the washer feeding attachment embodying the features of this invention;

Fig. 2 is an enlarged plan view of the washer feeding attachment taken on the line 2—2 of Fig. 1 and rotated 90° in a clockwise direction to position it in line with an operator's position;

Fig. 3 is a vertical longitudinal section taken on the line 3—3 of Fig. 2;

Fig. 4 is an elevational view taken on the line 4—4 of Fig. 2;

Fig. 5 is a plan sectional view taken on the line 5—5 of Fig. 4;

Fig. 6 is an enlarged fragmentary vertical detail section taken on the line 6—6 of Fig. 3;

Fig. 7 is a greatly enlarged fragmentary portion of Fig. 3 showing abutting sets of washers of different combinations of thickness that may be advanced between the resiliently and pivotally mounted guiding and positioning members without jamming or wedging, the sets of washers being shown advanced one position from that shown in Fig. 3 whereby the right hand set of washers is at the assembling position;

Figs. 8, 9, 10 and 11 are vertical sections taken on the lines 8—8, 9—9, 10—10 and 11—11, respectively, of Fig. 7, and Fig. 12 is a plan view of a connecting block base member which is adapted to have assembled therewith washers and screws by the apparatus of this invention, the upper portion of the base member being shown with the assembled washers and screws.

Referring to the drawings, particularly to Fig. 1, wherein the washer feeding apparatus embodying the features of this invention is shown applied to a power screw driver of a commercial type, a horizontal arm of the screw driver machine framework (shown fragmentarily) is indicated at 10. Pivoted at 11 is an actuating lever 12 operatively associated at its free end with a rotatably and reciprocably mounted screw driver spindle 13, the spindle being continuously rotated by a belt and pulley 14, the belt being connected to a suitable source of power. The lever 12 is actuated by a downward movement of a link 15 which may be connected at its lower end to a foot treadle or other actuating means (not shown). Each time the link 15 is moved downwardly the spindle 13 is likewise moved to advance a screw driver blade 16 (Figs. 3 and 4) into operative engagement with the slotted head of a screw 17 supported on the lower face of its head between shouldered surfaces 18 (Fig. 3) on yieldable reciprocable embracing members 19 normally yieldably retained in screw embracing relation by leaf springs 20. The spindle 13, blade 16, and screw embracing members 19 are returned to their normal upper position by spring pressure upon the link 15 being permitted to move upwardly. Associated with the embracing members 19 is a chute 21 down which screws are automatically unloaded, one at a time, in timed relation with the reciprocating screw driver blade 16. The screw embracing members 19 are provided at one side with an opening 23 (Fig. 2) for receiving the screws from the chute 21. A stationary cone ended pin 24 is arranged in the path of and suitably engaged by the reciprocable embracing members 19 along the line of division therebetween and opposite their sides having the opening 23 for the entrance of the screws. The embracing members 19 are moved downwardly when the screw driver blade 16 engages a screw 17 supported by the members and in the continued advance of the blade the members move into engagement with the pin 24 whereupon the yieldable embracing members 19 are separated, thus releasing the screw and permitting it to be moved downwardly by the blade 16 and threaded into a threaded aperture in an article positioned below the members 19. At the end of a return or upward movement of the parts to the position shown in Fig. 1, after the driving of the screw 17, the upper end faces of the yieldable embracing members 19 engage a stationary cone ended pin (not shown) disposed along the line of division therebetween and the members are separated to permit another screw 17 to be freely received therebetween. In the next downward movement of the spindle 13 the members 19 are released and they close up on the screw and hold it firmly during its movement into the apertures of the washers aligned therewith.

Since the power screw driver and screw supplying mechanism hereinbefore briefly described are of commercial types and well known in the art a more complete description thereof is not believed necessary to a full understanding of the present invention. For a more complete disclosure of a power screw driver and screw supplying mechanism of the general type referred to herein reference may be had to United States Patents 1,862,845, June 14, 1932, and 1,866,880, July 12, 1932 to F. H. Dellaree.

The assembling apparatus embodying the features of this invention is particularly adapted for use in assembling screws with washers and then driving the screws into threaded apertures in an article, which in the present instance is a connecting block base member 26, such as is shown best in Fig. 12. The member 26 is used to connect the terminal wires of a telephone set to line wires and comprises an irregular shaped block of insulating material provided with four fixed tubular inserts 27 threaded internally to receive the binding screws 17, which before being threaded thereinto are each assembled with a pair of washers 29 (Fig. 7). For the purpose of facilitating the insertion of the terminal wires between the washers 29 the peripheral edges thereof are beveled or tapered, as indicated at 31, it being understood that the edge is not of a knife edge type, but is rounded.

For feeding a pair of washers 29 into coaxial alignment below each screw 17 and suspended between the embracing members 19 and in timed relation with the advance of the rotating screw driver blade 16 to engage the slot in the screw head the following apparatus is provided.

Attached to and extending from the frame of the screw driving machine below the members 19 is a horizontal plate 32 (Figs. 1, 2 and 3) which at its free end is formed with a notch 33 which provides two vertical walls serving as stop faces against which two sides of the member 26 (Fig. 12) are positioned by an operator while the four screws 17 with the assembled washers 29 thereon are successively driven into the threaded inserts 27 of the member 26, as the latter is manipulated by the operator. The upper face of the plate 32 is shouldered at its free end as indicated at 34 and formed in the upper face and extending from the shoulder toward the opposite end of the plate for a suitable distance is a slideway 35 (Figs. 2 and 3) having parallel vertical sides of sufficient depth and spacing to permit two washers 29, one above the other, to be freely advanced therealong. Fitted to slide in the slideway 35 is a slide 36 having an upwardly extending portion fitted to slide in a shouldered slideway 37 (Fig. 3) formed in the lower face of an apertured plate 38. Above the plate 38 is a block 41 having a slot 42, which is centered with the slideways 35 and 37 and slide 36.

Journaled in the block 41 is a shaft 43 to which is fixed a slide operating arm 44, which, at its free lower rounded end extends through the aperture in the plate 38 and into a suitable opening in the slide 36. In the retracted position of the slide, the arm 44 engages a stop surface 45 on the plate 38, as shown in Fig. 3. Fixed to one end of the shaft 43 is a lever 48 (Fig. 2) in the free end of which is journaled the lower end of a rod 49, the upper end of the rod having a free sliding fit in an L-shaped bracket 50 (Fig. 1) attached to the actuating lever 12. The upper end of the rod, which extends from the bracket, carries an adjustable collar 51 and surrounding the rod below the bracket is a compression spring 52, which abuts at opposite ends an adjustable collar 53 on the rod and the lower face of the bracket. This spring arrangement provides a resilient connection between the lever 12 and the rod 49 to accommodate for an overtravel of the lever. An adjustable stop member 56, carried by the lever 48 and engageable with the upper face of the plate 32 during the downward or actuating movement of the lever 12, limits the movement of the operating arm 44 to advance the slide 36 and thereby a pair of washers 29 a predetermined accurate distance.

The washers 29 to be advanced in pairs to the assembling position are strung on a rod 58 which at its upper end is hooked and supported in an apertured bracket 59 attached to the arm 10 of the framework of the machine. At its lower end (Fig. 3) the rod 58 is entered in an aperture 60 extending through the block 41 and plate 38 and the stack of washers surrounding the rod rest on the slideway 35, the rod extending partly through the aperture in the block 41. Thus, as the slide 36 is advanced towards the right, as viewed in Fig. 3, the two lower washers of the supply stack will likewise be advanced and upon the retraction of the slide, to the position shown, the stack of washers on the rod 58 moves downwardly to position the two lower washers in the slideway 35 in the path of the slide 36 for the next feeding movement thereof.

Pivoted, as indicated at 62 (Fig. 2) to the plate 32 adjacent the shoulder 34 is a pair of spaced washer guiding and positioning members 63, their inner opposed edges being disposed parallel and equi-distantly from the longitudinal center line of the slideway 35. A plate 65 (Fig. 6) fixed to the upper face of the plate 32 and extending at opposite longitudinal edges within recesses formed in the opposed inner spaced edges of the members 63 serves to maintain the members suitably spaced during the advance of the washers 29 therebetween. Pins 64 fixed in the plate 32 and extending into arcuate slots in the members 63 serve to limit the pivotal movements of the members away from each other. Leaf springs 66 carried on the plate 32 and pressing against the outer edges of the pivotal members 63 adjacent their outer ends normally urge the members towards each other. Formed in the opposed inner edges of the members 63 are aligned slideways 67 (Figs. 6, 7 and 8) each formed with inwardly diverging V-shaped inner side walls 68 upon the inclined or beveled faces of which the peripheral edges of the pairs of washers 29 slide, in being advanced to the assembling position. The outer ends of the opposed inner edges of the members 63 are formed with arcuate shaped faces 70 (Figs. 2, 3 and 7) disposed in axial alignment with the screw driver blade 16, the upper edges of the faces being beveled to readily permit the entrance therebetween of a screw 17 in the assembling operation. The V-shaped side walls extend slightly beyond the center of the washers as indicated at 71 (Figs. 3, 7 and 11) when they are in assembling position between the arcuate shaped faces 70 and thus are positively but lightly supported at diametrically opposite points upon the beveled or inclined side walls 68 of the slideways 67.

A tapered pin 72 (Fig. 3) is arranged below the members 63 and in axial alignment with the arcuate shaped faces 70 thereof, the pin being carried on the end of a leaf spring 73 secured to the lower face of the plate 32. In positioning a connecting block base member 26 against the stop faces of the notch 33 in the plate 32 to have a screw 17 and a pair of washers 29 assembled thereon the upper end of the tapered pin snaps into the aperture in the tubular threaded insert 27 in the member 26 and during the driving of the screw 17 serves as a resilient support, thus facilitating the holding of the member 26 by the operator.

As hereinbefore mentioned, the washers 29 due to manufacturing difficulties, may be of varying thickness and since they are strung at random upon the rod 58 successive pairs of washers, being advanced along the slideway 35 and the slideways 67 of the members 63, may differ considerably in their overall thickness, due to varying combinations of washers. During the operation of the machine the slideways 35 and 67, as shown, will contain four pairs of washers and successive pairs may consist of the combinations shown in Figs. 7 to 11, inclusive, beginning with the left hand or last pair of washers to be moved along the slideway 35 (Fig. 3) from the supply stack, of upper and lower washers of maximum and minimum thickness, respectively, in advance thereof and from left to right a pair of washers of maximum thickness, a pair of washers of minimum thickness and then a pair of washers with the upper washer being of a minimum thickness and the lower washer of a maximum thickness. It is to be understood that the distance between the upper and lower faces of the slideways 35 and 67 is such that two washers of maximum tolerable thickness may freely move therealong and also that the inclination of the side walls 68 of the slideways 67 are slightly greater than that of the beveled peripheral edges 31 of the washers so that the edges only of the washers will constantly ride upon the side walls 68.

In the operation of feeding successive pairs of washers 29 by means of the reciprocable slide 36, the operation of which it is believed is clearly understood without further description, from the slideway 35 into position between the opposed slideways 67 of the resiliently mounted guiding and positioning members 63 each pair of washers will automatically be raised or lowered depending on the particular combination and thickness of the washers comprising each pair, whereby their beveled peripheral edges will be positioned equally above and below the center line of the V-shaped slideway side walls 68 indicated at 75 (Figs. 7 and 8). As clearly shown in Figs. 7 to 11, inclusive, the four successive abutting pairs of washers 29 have each been individually arranged upon the slideways 67 by the cooperative action of the inclined faces of the side walls 68 and the resilient members 63, the beveled peripheral edges of the washers riding upon the inclined side wall faces, according to the particular thickness of the washers in each pair and their outer end faces are spaced from the upper and lower horizontal faces of the slideways 67. In Figs. 7 and 8 the pair of washers last moved into the slideways 67 comprises an upper washer of maximum thickness and a lower washer of minimum thickness, and it will be noted that the washers abut at their inner faces and the beveled peripheral edges of the washers are equally spaced from the center line 75 of the V-shaped slideway side walls 68. The next pair of washers (Figs. 7 and 9) comprises two washers of maximum thickness with their peripheral edges equally spaced from the center line 75 of the side walls 68 and slightly displaced above and below the plane and outside of the peripheral edges of the washers at their left. In advance of the two thick washers is a pair of washers of minimum thickness (Figs. 7 and 10) having their peripheral edges equally spaced from the center line 75 of the side walls 68 slightly displaced above and below the plane of and between the peripheral edges of the washers at their left. The next pair of washers (Figs. 7 and 11) abutting the pair of thin washers comprises an upper washer of minimum thickness, and a lower washer of maximum thickness, and their peripheral edges are equally spaced from the center line 75 of the side walls 68 and slightly displaced above and below the plane of and outside the peripheral edges of the washers at their left.

With this type of slideway any displacement of the peripheral edges of the washers of one pair from the plane of the peripheral edges of an adjacent abutting pair is reduced to a minimum, since the edges are not of a knife edge type but are rounded, the slight displacement between the planes of the rounded edges being not sufficient to cause the abutting pairs of washers to ride under or above the beveled edges of the adjacent pair and consequently the sets of washers are advanced to the assembling position without jamming or wedging in the slideway. It will be obvious that if sets of abutting washers of the type disclosed were advanced with the bottom faces of the lower washers in a common plane upon the bottom face of a slideway having straight side walls, the cumulative displacement between the beveled edges would be such that the washers would ride under or above one another, and consequently jam the slideway.

Although the washer guiding and positioning members 63 in the present embodiment of the invention are provided with inclined side walls 68 for acting upon a succession of pairs of superimposed washers of the type described, it will be understood that the members may each be provided with a single or a series of inclined side walls effective to act upon a plurality of single washers or of pairs of superimposed washers and that such arrangements are within the scope of the invention.

From the foregoing description, it will be apparent that a simple and practical apparatus has been devised for accurately feeding elements with beveled peripheral edges along a slideway without jamming or wedging to a position for assembly with another part and positively supporting the elements in such position until they are assembled with the other part.

The features of the invention in addition to their application above described are also applicable to the handling of straight edged washers of varying diameters either of uniform or non-uniform thickness when the dimensions are within tolerable limits. Thus, in feeding a plurality of straight edged washers of varying diameters as a unit along the V-shaped slideways 67 to the assembling position below a screw and screw driver blade and a washer of smallest diameter is at the bottom of the unit it will be positively supported on the inclined wall portions 71 of the slideways (Fig. 3) and will not drop away from the other washers which would be the case if the side walls of the slideways were vertical.

While the features of this invention have been disclosed in a specific structure for handling particular types of elements having beveled peripheral edges, it should be understood that modifications can be made and it is capable of other applications and should be limited only by the scope of the appended claims.

What is claimed is:

1. In an apparatus for advancing to a predetermined position a plurality of beveled edged abutting sets of superimposed parts of varying thickness within tolerable limits, means to support the sets of parts and advance the same in succession, and yieldable slideways each having inwardly diverging surfaces upon which the edges of the sets of parts slide, the yieldable action of the slideways and said surfaces thereof cooperating to position each set of parts of varying thickness with their edges in substantial alignment.

2. In an apparatus for advancing to a predetermined position a plurality of abutting sets of superimposed circular parts of varying thickness within tolerable limits having beveled edges, means for supporting sets of parts, means for advancing therefrom sets of parts in succession, and yieldable slideways each having inwardly diverging surfaces adjoining said supporting means for receiving the sets of parts and upon which the edges of the sets of parts slide, the yieldable action of the slideways and said surfaces thereof cooperating to position each set of parts of varying thickness with their edges in substantial alignment.

3. In an apparatus for advancing to a predetermined position a plurality of abutting sets of superimposed circular parts of varying thickness within tolerable limits having beveled edges, a slideway for receiving sets of parts, a slide in said slideway for advancing therefrom sets of parts in succession, and yieldable members adjoining said slideway between which the sets of parts are advanced from said slideway, said members each having inwardly diverging slideways upon which the edges of the sets of parts slide, the yieldable action of the slideways and said surfaces thereof cooperating to position each set of parts of varying thickness with their edges in substantial alignment.

4. In an apparatus for advancing to a predetermined position a plurality of abutting sets of superimposed circular parts of varying thickness within tolerable limits having beveled edges, a slideway for receiving sets of parts, a slide in said slideway for advancing therefrom abutting sets of parts in succession, spaced spring pressed pivotal members adjoining said slideway upon which the sets of parts are advanced from said slideway, stop means for limiting the movement of said members to and from each other, each of said members upon opposed faces having aligned inwardly diverging slideway surfaces upon which the beveled edges of the parts slide effective in cooperation with the pivotal spring pressed action of the members to position each set of parts of varying thickness during their advance with their edges in substantial alignment.

5. In an apparatus for advancing to a predetermined position a plurality of abutting sets of superimposed circular parts, means for supporting sets of parts, means for advancing therefrom sets of parts in succession, and yieldable slideways having inwardly diverging surfaces adjoining said supporting means upon which the sets of parts are moved by said advancing means from the supporting means, said slideways having opposed indentations at the predetermined position to permit the removal of the sets of parts along a line coincident with their axes from between the yieldable slideways, said surfaces in the slideways terminating beyond the center of the parts and tapering into the opposed peripheral surfaces of the indentations when the parts are between the indentations whereby the parts are positively but lightly supported thereat upon said slideway faces.

6. In an apparatus for advancing to a predetermined position a plurality of abutting sets of superimposed circular washers, a slideway for receiving sets of washers, a slide in said slideway for advancing therefrom sets of washers in succession, and yieldable members each having inwardly diverging slideways upon which the sets of washers are advanced, said members having opposed indentations at the predetermined position to permit the removal of the sets of washers along a line coincident with their axes from between the yieldable members, said slideways in the members terminating beyond the center of the washers and tapering into the opposed peripheral surfaces of the indentations when the washers are between the indentations whereby the washers are positively but lightly supported thereat upon the slideways.

LAWRENCE McLAUGHLIN.